UNITED STATES PATENT OFFICE.

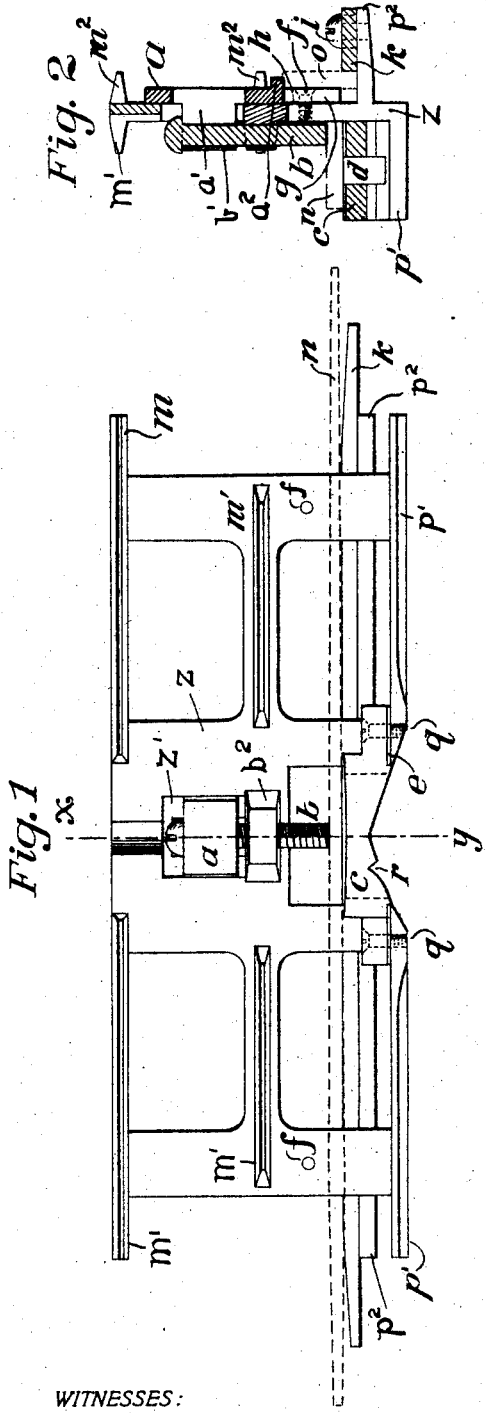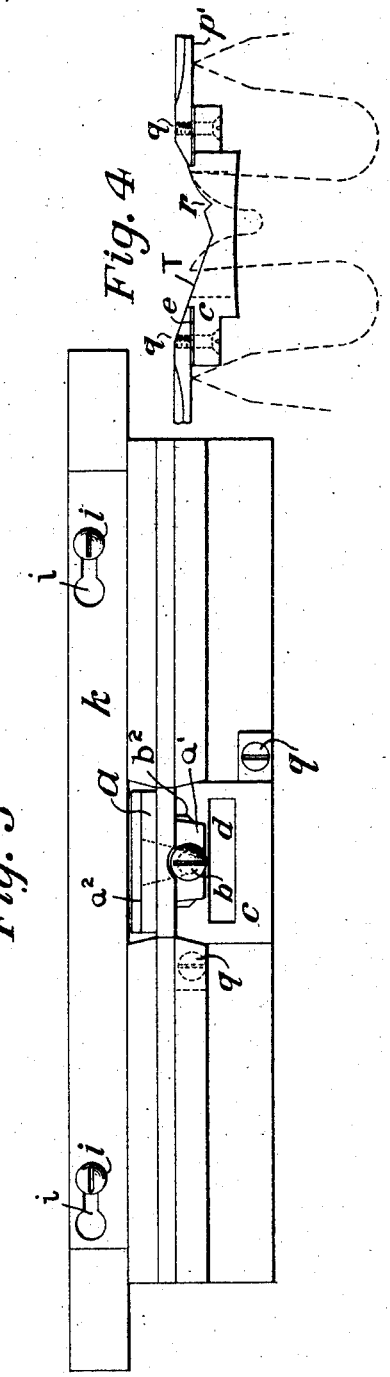

CECIL R. PIERCE, OF RAINIER, WASHINGTON.

SAW-JOINTER.

No. 882,961.  Specification of Letters Patent.  Patented March 24, 1908.

Application filed September 6, 1904. Serial No. 223,449.

*To all whom it may concern:*

Be it known that I, CECIL R. PIERCE, residing at Rainier, in the county of Thurston and State of Washington, have invented a new and useful Improvement in Saw-Jointers; and I do hereby declare the following to be a full, clear, and exact description of the invention, such as will enable others skilled in the art to which it appertains to make and use the same.

The invention relates to saw-jointers, and has for its object to provide means for pointing the raker teeth of a cross-cut saw into uniform length, and for accurately side-dressing its cutting teeth.

The invention will be readily understood from a consideration of the following detailed description, and from an inspection of the accompanying drawings, in which latter like parts are designated by corresponding reference numerals in the several views.

Of the said drawings—Figure 1 is a side elevation of the complete invention. Fig. 2 is a section taken on the line $x$—$y$ of Fig. 1. Fig. 3 is a plan view of Fig. 1. Fig. 4 is an enlarged detail view in elevation of the pointer-plate, showing in dotted lines a portion of a saw. In Figs. 1 and 2 the device is shown in inverted position to illustrate more clearly the manner in which the clamping slide and screw are adjusted.

Referring more particularly to the drawings, $z$ designates generally the jointer-frame provided with the parallel middle and lower side guides or flanges $m'$ and $m^2$, disposed on opposite sides thereof, the frame being further provided, on opposite sides, at its top with the lateral flanges $p'$ and $p^2$, the flange $p'$ being cut away intermediate its ends, as indicated by the reference character $p^3$, to form a seat.

Disposed centrally of the frame, and secured by screws $q$ to the under face of the top flange $p'$ within the seat therein is a gage-plate $c$, having a slot $d$ formed longitudinally therethrough, as shown in Figs. 2 and 3. The under face of plate $c$ is slightly concaved, as shown in Fig. 1, while its upper or pointing face is provided with a grooved bevel $r$ and straight or plane bevel $r'$, whereby the raker teeth may be jointed to a flat or curved pitch, according as desired. Plate $c$ may be secured to the flange $p'$ at a greater or less distance from the under face thereof by means of packing $e$ interposed between said plate and flange, as indicated in Figs. 1 and 4, the quantity of packing being varied at will, it being only necessary to loosen the screws $q$, when said plate may be withdrawn sufficiently to allow the packing to be interposed as above stated. The frame $z$ is further provided with a slot $z'$, formed therethrough about centrally thereof, to provide an opening in which a forwardly extending shoulder $a'$ formed on a slide $a$, has a vertical movement, said shoulder having an opening $b'$ formed therethrough, in which a threaded screw $b$ fits, there being a shoulder $b^2$ formed on frame $z$ directly above the slot $z'$ provided with a threaded opening in alinement with the opening $b'$, the end of screw $b$ passing through said openings, as shown. It will therefore be apparent that when screw $b$ is turned in one direction or the other, the slide $a$ carried thereby will have a proportionate vertical movement, and it will be likewise obvious that a file $n$ may be clamped against the under face of plate $c$ by means of said screw, the file being given a slight bend by reason of the concave formation of the plate above referred to.

The opposite top flange $p^2$ carries, on its under face a guide-plate $k$ provided with key-hole slots $i'$ through which the screws $i$, for fastening said plate thereto, pass, such construction permitting a longitudinal adjustment of said plate, as will be readily understood. This plate assists in retaining a file $o$ in place, as shown in Fig. 2, the file being further held by means of an outwardly extending shoulder $a^2$ formed on the upper portion of slide $a$. To adjust the set of the file $o$ a pair of screws $f$ each carrying a block $g$ is disposed towards the opposite side edges of the frame, so that said blocks may be moved towards or away from the corresponding face of the frame, there being a strip of packing $h$ interposed between each block and the frame similar to the packing strips $e$, above referred to.

In the operation of the device, the points of the cutting teeth of the saw are jointed in the usual manner by means of the file $n$, positioned as above described, the guides $m'$ fitting against the side of the saw, the device being slid from one end of the saw to the other, as will be readily understood. The cutting teeth are then side-dressed, in like manner, by the file $o$. The raker-teeth of the saw may in like manner, be pointed, and the requisite pitch thereof determined by the plate $c$, the provision of the slot $d$ therein allowing the teeth to be filed to project therethrough, as shown in Fig. 4, out of the range of the adjacent cutting teeth, it being understood, of course, that said opening $d$ will be of sufficient extent to admit various sizes of raker teeth therethrough.

Further description of the invention and its operation is deemed unnecessary in view of the foregoing.

What is claimed, is:

A saw jointer comprising, in combination, a frame provided with outwardly projecting flanges formed on opposite sides thereof, and with a centrally disposed vertical slot; a gage plate carried by one of said flanges and disposed in line with said slot; a member slidable against one face of the frame and provided upon one side with a lateral shoulder projecting through said slots; a lateral shoulder formed on the frame between the gage plate and the first-mentioned shoulder and alining with the same; a bolt engaged with said shoulder for moving said slide, said bolt having loose connection with one of said shoulders and threaded connection with the other shoulder; and a lateral shoulder formed on the other side of said slide, whereby a file may be clamped between the last-mentioned shoulder and the adjacent flange on one side of the frame, or between the bolt end and the gage plate on the other side of the frame.

In testimony whereof I have signed my name to these specifications in the presence of two subscribing witnesses.

CECIL R. PIERCE.

Witnesses:
  A. J. FALKNOR,
  P. M. TROY.